United States Patent
Ruffa

(10) Patent No.: US 9,945,941 B1
(45) Date of Patent: Apr. 17, 2018

(54) SIMULTANEOUS CONTINUOUS WAVE SIGNALS

(71) Applicant: Anthony A Ruffa, Hope Valley, RI (US)

(72) Inventor: Anthony A Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 294 days.

(21) Appl. No.: 14/867,267

(22) Filed: Sep. 28, 2015

(51) Int. Cl.
| | |
|---|---|
| *G01S 13/32* | (2006.01) |
| *G01S 13/58* | (2006.01) |
| *G01S 15/58* | (2006.01) |
| *G01S 7/35* | (2006.01) |
| *G01S 7/534* | (2006.01) |

(52) U.S. Cl.
CPC ........... *G01S 13/584* (2013.01); *G01S 7/352* (2013.01); *G01S 7/534* (2013.01); *G01S 15/586* (2013.01); *G01S 2007/356* (2013.01)

(58) Field of Classification Search
CPC .............................. G01S 13/584; G01S 7/352
USPC ............................................ 342/83–85, 109
See application file for complete search history.

(56) References Cited

U.S. PATENT DOCUMENTS

| | | | | |
|---|---|---|---|---|
| 6,469,659 B1* | 10/2002 | Lajiness | ............... | G01S 7/4004 342/159 |
| 9,715,014 B2* | 7/2017 | Schoor | .................. | G01S 13/931 |
| 9,733,340 B2* | 8/2017 | Rao | ......................... | G01S 7/032 |
| 2006/0220946 A1* | 10/2006 | Nohmi | ...................... | G01S 7/35 342/107 |
| 2009/0009381 A1* | 1/2009 | Inaba | ...................... | G01S 13/34 342/109 |
| 2014/0070985 A1* | 3/2014 | Vacanti | ................... | G01S 13/10 342/201 |
| 2014/0118184 A1* | 5/2014 | Minowa | ................ | G01S 13/581 342/104 |
| 2015/0007655 A1* | 1/2015 | Skowaisa | ............... | G01S 13/34 73/198 |
| 2015/0285897 A1* | 10/2015 | Kilty | ......................... | G01S 7/02 342/195 |
| 2016/0061947 A1* | 3/2016 | Patole | .................. | G01S 13/584 342/109 |

* cited by examiner

*Primary Examiner* — Marcus E Windrich
(74) *Attorney, Agent, or Firm* — James M. Kasischke; Michael P. Stanley

(57) ABSTRACT

A method is provided for transmitting a plurality of narrowband signals in estimating a Doppler shift of a target object. The method includes simultaneously transmitting at least two narrowband signals from a source and receiving incident signals at a receiver. Multiple narrowband signals can be sent simultaneously and in combination with broadband signals from a source. The incident signals are filtered and processed to determine range and Doppler shift of the target.

3 Claims, 3 Drawing Sheets

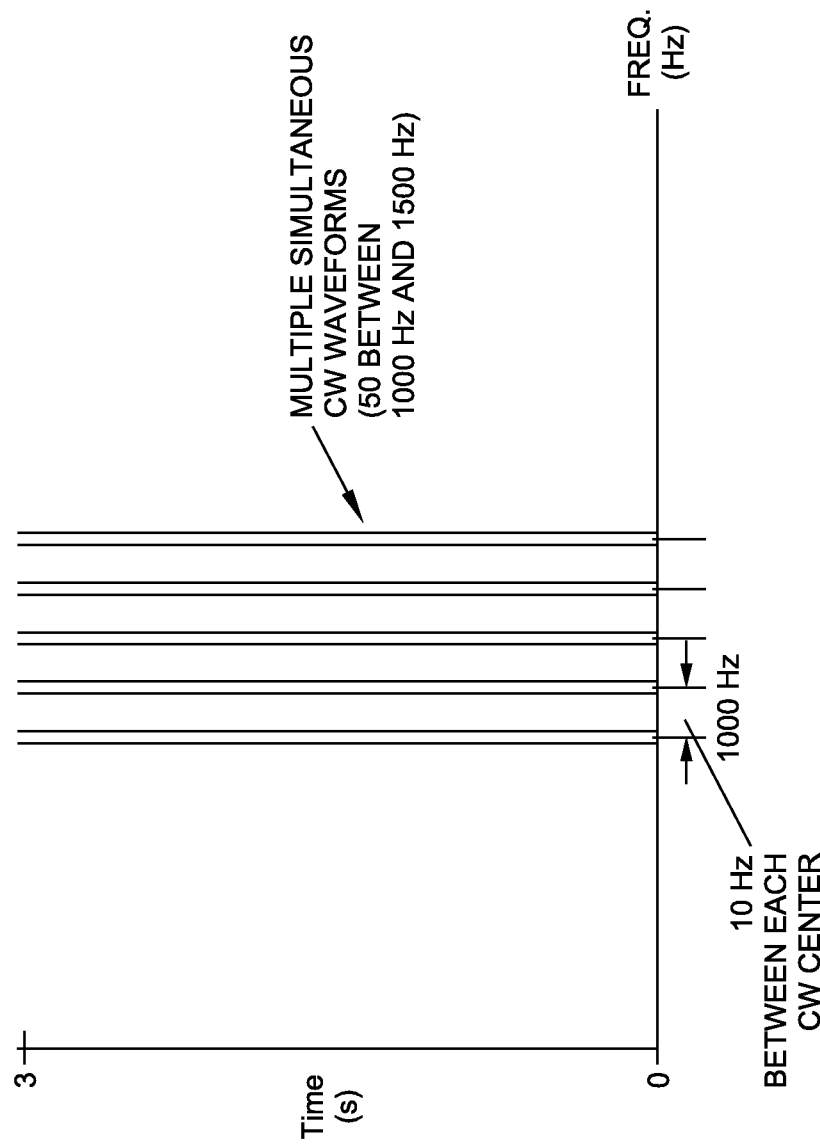

SIMULTANEOUS CONTINUOUS WAVE SIGNALS

STATEMENT OF GOVERNMENT INTEREST

The invention described herein may be manufactured and used by or for the Government of the United States of America for Governmental purposes without the payment of any royalties thereon or therefore.

CROSS REFERENCE TO OTHER PATENT APPLICATIONS

None.

BACKGROUND OF INVENTION

1) Field of the Invention

The present invention is directed to improving Doppler shift and range resolution of a target through simultaneous transmission of narrowband and broadband signals.

2) Description of Prior Art

Accurate measurements of the range and Doppler shift of a target are used to identify the position and speed of that target relative to a source. A number of waveform signals can be used to ascertain the range and Doppler shift of the target. In operation, these waveform signals are transmitted from a source and incident signals are received at a receiver for processing. The processed signals provide range and Doppler shift information.

The selection of a given waveform is determined by the effectiveness in producing a desired measurement. Previous approaches for determining the range and Doppler shift of a target include the use of a narrowband signal (e.g., a continuous wave (CW) waveform signal), a broadband signal (e.g., a frequency modulated (FM) waveform signal), or a hybrid of these signals—for example, a frequency-hopped (FH) waveform signal.

A CW waveform is a narrowband wave that performs well in resolving Doppler shifts, but has poor performance in resolving ranges. FM waveform signals exhibit good performance in resolving target ranges but due to their larger bandwidth exhibit poor performance in resolving Doppler shifts.

The FH waveform signal contains numerous short signal pulses having varying frequencies. As a hybrid of CW and FM waveform signals; the FH waveform signal comprises numerous short signals that have varying frequencies within the overall bandwidth; yet, each short signal is narrowband in nature. The use of FH waveform signals maintains the FM-type range resolution, while improving the Doppler resolution resulting from the CW-type Doppler shift. However, the improvement in Doppler shift resolution is less than what is achieved with a CW signal alone.

It is therefore necessary to address the limitations of existing measurement methods in order to achieve more accurate determinations of range and Doppler shift of a target object.

SUMMARY OF THE INVENTION

Exemplary embodiments of systems and methods in accordance with the present invention are directed to varying methods of emitting narrowband signals in order to improve Doppler shift and range resolution of a given target.

Specifically, the present invention transmits narrowband signals simultaneously (i.e., in parallel) with broadband and other signals (even with other narrowband signals). Transmitting a narrowband signal with a broadband signal leads to a comparatively-small penalty in decreased bandwidth, and at the same time leads to a substantive improvement in Doppler resolution. This is because the narrowband signal can be filtered from the other signals and processed as if it was sent alone.

In one embodiment, a method to improve Doppler shift resolution includes simultaneously transmitting at least two narrowband signals at different frequencies. The narrowband signals can take the form of electromagnetic waves or sonar (acoustic) signals. Furthermore, the narrowband signals can include simultaneously transmitted continuous wave signals at different frequencies.

In another embodiment, a method to improve Doppler shift resolution includes simultaneously transmitting at least one broadband signal with at least one narrowband signal from a source. Each narrowband signal and broadband signal comprises electromagnetic waves, sonar (i.e., acoustic waves), or combinations thereof. Furthermore, the narrowband signal can include one or more continuous wave signals and the broadband signal can include one or more frequency modulated signals.

The emitted signals are reflected off an object and are received as incident signals at a receiver. The incident signals are filtered to separate narrowband and broadband incident signals before processing each signal type. The incident signals may then be used to determine and improve the Doppler shift resolution of an object.

Methods for processing one or more incident signals vary and depend on the desired measurement. One method to improve the estimate of the Doppler shift of an object includes simultaneously receiving at least two narrowband incident signals at a receiver. This is followed by filtering the narrowband incident signals (to isolate each narrowband signal from the others so that they can be processed separately) and concluded by processing the incident signals to obtain an estimate of the Doppler shift. Using a plurality of narrowband signals improves the resolution of the Doppler shift measurements associated with an object.

In yet another embodiment, improved simultaneous estimates of the range and the Doppler shift of an object comprises simultaneously receiving at least one broadband and at least one narrowband incident signal at a receiver. The action is followed by filtering the narrowband incident signals from the broadband signals so that they can be processed separately, and concluded by processing the narrowband signals to obtain an improved estimate of the Doppler shift and processing the broadband signals to obtain an improved estimate of the range.

BRIEF DESCRIPTION OF THE DRAWINGS

It will be understood that many additional changes in details, materials, steps, and arrangements of parts which have been described herein and illustrated in order to explain the nature of the invention, may be made by those skilled in the art within the principle and scope of the invention as expressed in the appended claims.

FIG. 3 is a time-frequency graph of simultaneously transmitted CW waveforms between 50 Hz and 1000 Hz.

DETAILED DESCRIPTION OF THE INVENTION

In the description which follows, any reference to either direction or orientation is intended primarily and solely for purposes of illustration and is not intended in any way as a limitation on the scope of the present invention. Also the particular embodiments described herein, although being preferred, are not to be considered as limiting of the present invention.

In the context of this invention, parameters can be placed on narrowband and broadband signals in which a narrowband signal must have a sufficiently narrow bandwidth to be useful for making Doppler estimates. The Doppler shift of an active signal is approximately $\Delta f = f_0 u/c$, where $f_0$ is the center frequency of the transmitted signal, u is the speed of the target perpendicular to the receiver, and c is the speed of sound in water (for an example involving underwater sound). The bandwidth of the transmitted signal $f_{BW}$ should be small compared to $\Delta f$ to ensure that an accurate measurement can be made.

A broadband signal must have a sufficiently broad bandwidth to be useful for making range estimates. Such estimates are typically done with a matched filter, which a signal processing approach that is well known in the prior art. The accuracy of the range estimate is $\Delta r \sim c/f_{BW}$. In this case, the bandwidth of the transmitted signal $f_{BW}$ should be large enough to ensure that an accurate range measurement can be made.

Figure 1:
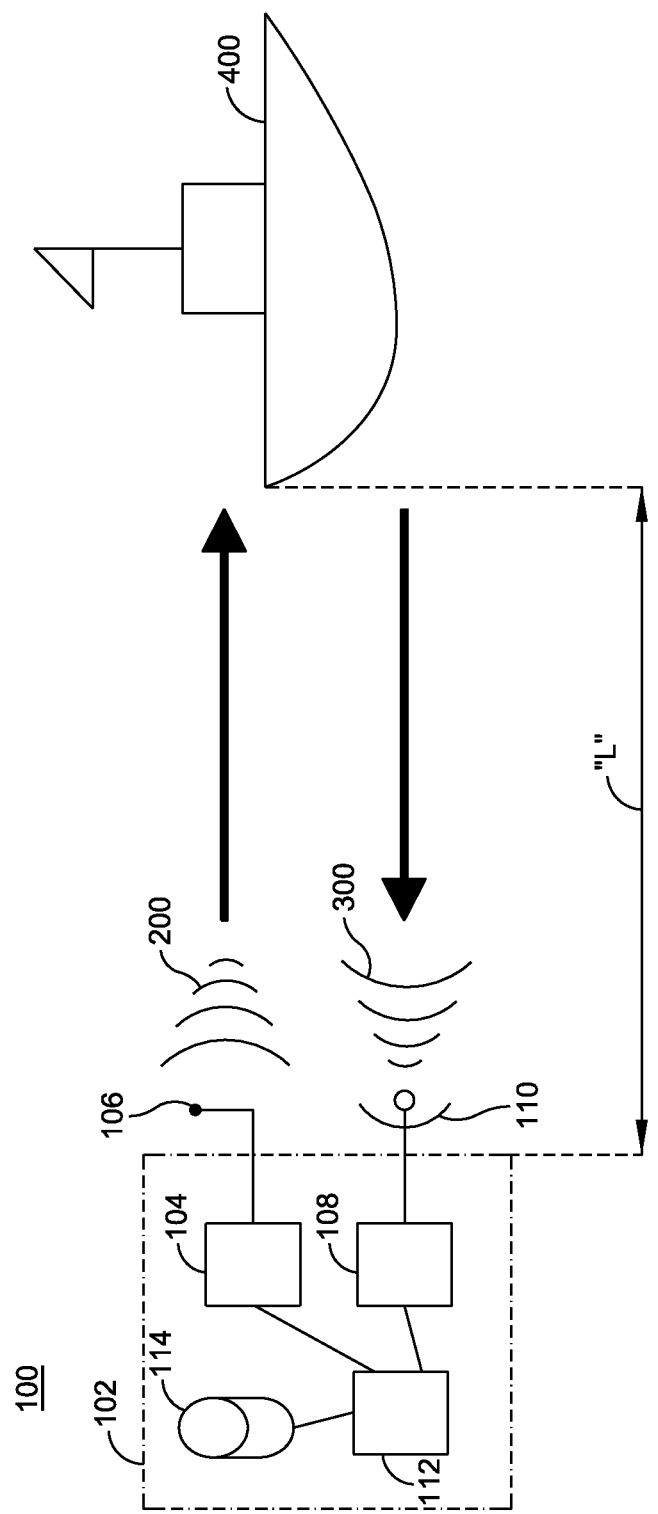
FIG. 1 is a schematic of an embodiment of system for use in measuring relative motion and distance in accordance with the present invention.

Referring to FIG. 1, an exemplary embodiment of a system 100 is illustrated for use in measuring both relative motion between a source and target object and distance between the source and target object. The system 100 includes a source 102. The source 102 can be fixed or mobile such as a ship or an airplane. The source 102 includes one or more transmitters 104 configured to transmit one or more signals 200 with a given waveform through one or more antennas 106. Suitable signals include radar signals, electromagnetic signals and sonar signals. Suitable waveforms include; but are not limited, to continuous wave (CW) waveforms and frequency modulated (FM) waveforms.

The source 102 also includes receivers or detectors 108 to detect signals 300 that reflect off a target object 400 by using one or more receiving antennas 110. Preferably, the target 400 is mobile such as a motorized vehicle, ship or airplane because Doppler shifts only occur when there is a relative motion between the target and the source/receiver. In this case, only the motion relative to the motion of the source/receiver relative to that target would be measured. However, it might not be known prior to measurement whether the target is mobile or stationary.

Suitable transmitters and receivers are known and available in the art. Although illustrated as being disposed within the source 102; the receiver 108 can also be independent of and separate from the source. The source 102 and the receiver 108 can include one or more logic processors 112 and one or more databases 114 to store and execute computer applications for generating, configuring and processing the transmitted signals 200 and the received signals 300.

The source 102 and the receiver 108 can be configured to filter the received reflected signal data to remove one or more portions of the signal data for separate processing. These separate portions are filtered based upon frequency. As known to those skilled in the art; the logic processors 112 process the reflected received signals, and if applicable; filter the received signals to determine a distance "L" between the source 102 and the target 400 (from the broadband signal component) as well as a current magnitude of the relative motion between the source and the target (from the narrowband signal component). This relative motion can be determined using the Doppler shift comparing corresponding portions of the transmitted and reflected signals.

Exemplary embodiments in accordance with the present invention are also directed to methods for measuring relative motion and distance between a source 102 and a target 400. In one embodiment, the method includes simultaneously emitting at least two signals including a narrowband signal of a given waveform from the source 102 toward the target 400. Suitable waveforms include, but are not limited to, CW and FM waveforms. Using narrowband signals reduces uncertainty in resolving the Doppler shift of an object. The alternative of only using broadband signals results in greater uncertainty in the Doppler shift estimates because the Doppler shifts are typically small compared to the bandwidth of a broadband waveform.

Figure 2:
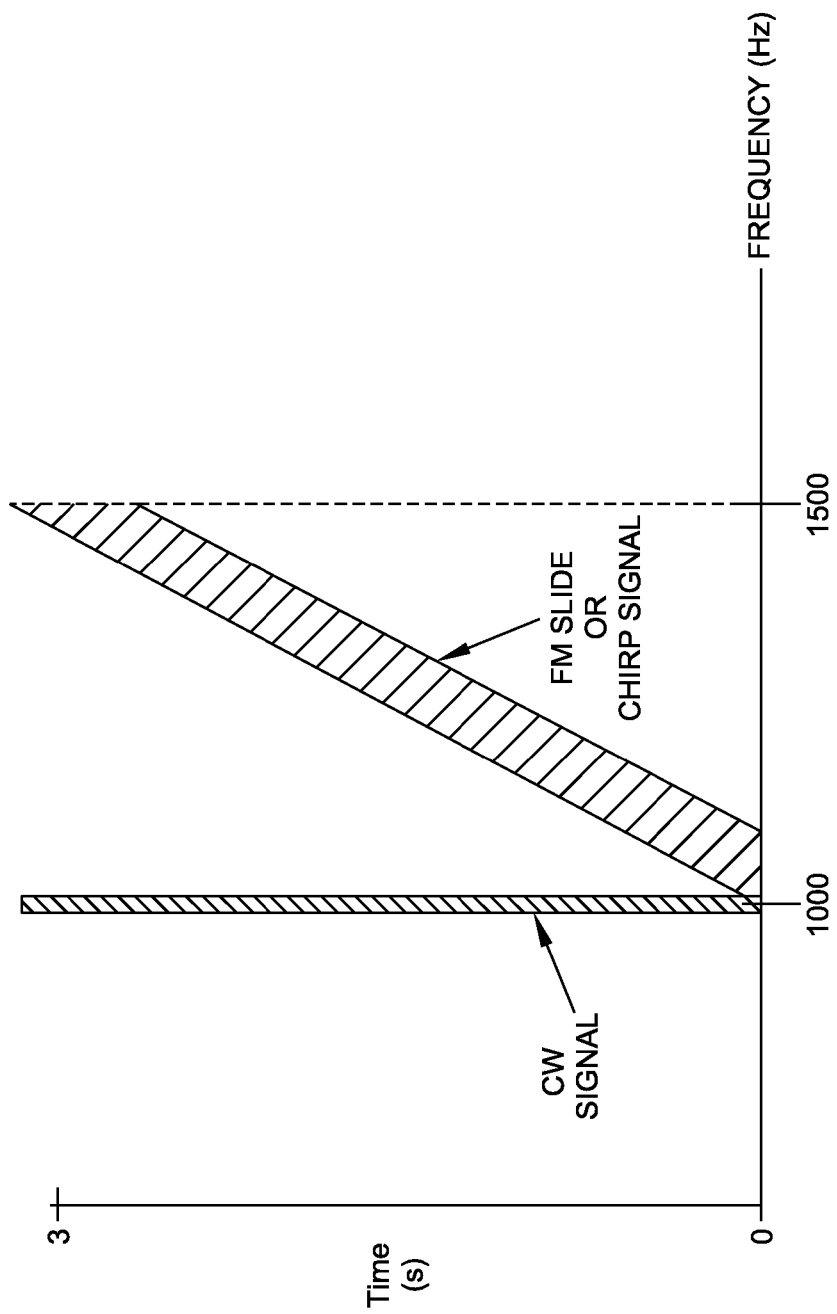
FIG. 2 is a time-frequency graph of a CW signal transmitted simultaneously with a FM waveform.

In one embodiment, a first signal having a narrow bandwidth is transmitted from the source 102 to the target 400, and a second signal having a second broader bandwidth is simultaneously transmitted from the source to the target. Suitable signals for the first signal and second signal include, but are not limited to, an electromagnetic signal, a sonar (i.e., acoustic) signal, and combinations thereof. A frequency-time plot of the simultaneously transmitted signals is shown in FIG. 2.

In an example of use, the CW signal has a duration of three seconds. The frequency uncertainty will be the inverse of the duration of the CW signal, or approximately ⅓ Hz. The CW waveform in this embodiment is transmitted at 1000 Hz. At the same time, a chirp or FM slide signal is transmitted at 1010 Hz to 1500 Hz.

Since the CW signal will require less than 10 Hz of bandwidth, the FM signal will go from 1010 Hz to 1500 Hz, instead of 1000 Hz to 1500 Hz. Thus, the penalty in terms of reduced bandwidth is very small: reducing the FM bandwidth from 500 Hz to 490 Hz reduces the spatial resolution by approximately two percent.

The signals sent from the source 102 are incident upon the target 400 and are reflected back toward the source from the target. The reflected signal from the target 400 is received at the receiver 108. This reflected signal includes a reflected first signal and a reflected second signal.

The reflected narrowband signal is filtered from the overall reflected signal (i.e., from the reflected broadband signal). The reflected narrowed signal is then processed separately from the reflected signal. Processing the reflected narrowed signal separately from the reflected signal includes processing the reflected narrowband signal to determine a Doppler shift indicative of a relative motion between the source 102 and the target 400. In addition, processing the reflected signal includes processing only the reflected broadband signal to determine an estimate of the distance between the source 102 and the target 400.

In addition to transmitting a broadband first signal; a plurality of separate narrowband signals can be simultaneously transmitted where each first signal has a bandwidth of less than 10 Hz. Each one of a plurality of reflected narrowband signals is filtered from the reflected signal.

In an alternative embodiment, narrowband signals are transmitted simultaneously from the source 102 to the target

400. Each narrowband signal constitutes a bandwidth of less than 10 Hz. In another embodiment, at least three separate narrowband signals are transmitted. In a further embodiment, fifty narrowband signals are transmitted. Each of the fifty narrowband signals occupies a separate 10 Hz range in the frequency band of approximately 1000 Hz to approximately 1500 Hz.

Again, a reflected signal from the target 400 at the receiver 108 includes the reflected narrowband signals. Each reflected narrowband signal is processed separately to determine a Doppler shift indicative of relative motion between the source 102 and the target 400. A Fourier transform is run on the reflected narrowband signals.

Alternatively, each one of the reflected narrowband signals is filtered from the reflected signal and each reflected narrowband signal is processed separately after filtering. In still another embodiment, a broadband signal is also transmitted from the source 102 to the target 400. This broadband signal is transmitted simultaneously with the narrowband signals. The reflected broadband signal is processed separately from the filtered reflected narrowband signals to determine a distance between the source 102 and the target 400.

The narrowband signal, such as a CW waveform signal, is transmitted simultaneously with at least one additional broadband signal—such as a FM waveform signal. Exemplary embodiments in accordance with the present invention result in minimally decreasing bandwidth while providing an improved Doppler shift resolution.

The minimally decreased bandwidth occurs because some of the bandwidth is used for the narrowband signal transmitted simultaneously with the broadband signal. By definition, the narrowband signal should require a very small bandwidth to ensure that it will lead to accurate Doppler measurements. So a broadband signal is transmitted that has only a slightly reduced bandwidth (relative to a signal transmitted without a simultaneous narrowband signal). This will lead to a range estimate having a slightly reduced accuracy. This is the only performance penalty.

As the CW waveform signal is transmitted simultaneously with the FM waveform signal; the incident CW waveform signal is filtered from the signal types. This filtering improves measurements of Doppler shift, since the incident narrowband signals are not affected by the broadband signals because the incident narrowband signals are in a different frequency band.

The CW waveform signal is processed to provide the Doppler resolution and the FM waveform signal is processed to provide the range resolution. This processing yields improved performance over other waveforms (including FH waveforms) that attempt to optimize range and Doppler resolution using a single waveform. Using a single waveform results in a compromise between CW and FM measurement performance. Systems and methods in accordance with the present invention use two separate waveforms transmitted simultaneously and processed independently.

While the range resolution decreases slightly (approximately 2%) due to the decreased bandwidth of the broadband or second signal; the Doppler resolution is comparable to that measured by a CW signal alone. Therefore, the overall performance is improved over the use of single waveform signals, such as the FH signal, which attempt to simultaneously optimize range and Doppler resolution.

In an example, the target 400 is located 5000 meters away from the source 102. The underwater two-way transit time of the transmitted acoustic signal is approximately six seconds.

The CW and FM waveform signals are transmitted simultaneously from the source 102. Although both signals are transmitted together, each signal type retains its characteristics. The CW waveform signal experiences a Doppler shift as if the CW waveform signal was transmitted independently. The FM waveform signal reflects off the target 400 to yield the range after matched filtering and yields the same accuracy as if the CW signal had not been transmitted.

When received at the receiver 108; the reflected CW waveform signal is filtered and processed independently to estimate the Doppler shifts, and the reflected FM waveform signal is processed separately to estimate the range. In the embodiment having the waveform shown in FIG. 2, the FM waveform has an approximately 490 Hz bandwidth instead of a 500 Hz bandwidth.

Variations of the transmitted signals can be used. For example, either one or more CW waveform signals are transmitted simultaneously with the FM waveform signal. The variation of transmitting CW waveform signals with the FM waveform signal yields a more accurate measurement of Doppler shift due to averaging of the two Doppler shift data points.

In another example, the 500-Hz band is populated with CW waveform signals as shown in FIG. 3. Each CW waveform signal utilizes approximately 10 Hz of bandwidth in order to provide sufficient frequency separation and to account for digital filtering. Up to 50 simultaneous CW pulses can be transmitted.

The received reflected signals can be separated by filtering and processed independently. A Fourier transform can be simultaneously applied on the 50 CW waveform signals without the use of filtering. The Fourier transform of the composite waveform super-positions the 50 individual Fourier transforms from each CW waveform signal at a different frequency. The 50 waveforms are separated in the frequency domain. This separation yields a gain in low-signal-to-noise ratio environments since the Doppler shift for all of the CW waveform signals are averaged; thereby, reducing noise.

The Doppler shift from each signal is plotted against the transmitted CW frequency, and a regression or best fit line is applied to the data points. While the uncertainty in each measurement will be approximately ⅓ Hz for a signal duration of three seconds, the overall uncertainty is reduced upon fitting a line to the data points. In this example, frequency uncertainty is reduced by a factor of $\sqrt{50}$.

Therefore the advantages and features of this method provide for an improved ability to simultaneously resolve range and Doppler shift of a target. In addition, if only an accurate Doppler shift measurement is needed, the method provides an improved ability to reduce uncertainty by simultaneously sending a plurality of CW signals.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A method to measure relative motion and distance for a target, said method comprising the steps of:
   transmitting a first continuous wave waveform signal with a narrow bandwidth from a source to the target;

transmitting a second signal with a broader bandwidth as a frequency modulated waveform signal from the source to the target, the second signal transmitted simultaneously with said transmitting step of the first signal and impacting the target with the first signal as a single beam from a single antenna;

receiving a reflected signal from the target at a detector, the reflected signal including a reflected first signal and a reflected second signal;

filtering the reflected first signal from the reflected signal;

processing the reflected first signal separately from the reflected second signal to determine a Doppler shift indicative of a relative motion between the source and the target;

filtering the reflected second signal from the reflected signal; and processing the reflected second signal to determine a distance between the source and the target.

2. A method to measure relative motion and distance for a target, said method comprising the steps of:

transmitting a first signal with a narrow bandwidth from a source to the target;

transmitting a second signal with a broader bandwidth from the source to the target, the second signal transmitted simultaneously with said transmitting step of the first signal and impacting the target with the first signal as a single beam as a single beam from a single antenna;

receiving a reflected signal from the target at a detector, the reflected signal including a reflected first signal and a reflected second signal;

filtering the reflected first signal from the reflected signal;

processing the reflected first signal separately from the reflected second signal;

filtering the reflected second signal from the reflected signal; and processing the reflected second signal;

wherein said step of transmitting the first signal further comprises transmitting a plurality of separate narrowband signals at varying center frequencies;

wherein said step of filtering the reflected first signal further comprises filtering each of the plurality of reflected first narrowband signals from the reflected signal;

wherein said step of processing the reflected first signal further comprises processing each of the plurality of reflected first narrowband signals separately from the reflected signal.

3. A method to measure relative motion and distance for a target, said method comprising the steps of:

transmitting a plurality of narrowband signals simultaneously from a source to the target;

receiving a reflected signal from the target at a detector, the reflected signal comprising a plurality of reflected narrowband signals;

filtering each one of the reflected first narrowband signals from the reflected signal; and processing each reflected narrowband signal separately subsequent to said filtering step to determine a Doppler shift which reflects an estimate of a relative motion between the source and the target;

transmitting a broadband signal from the source to the target, the broadband signal transmitted simultaneously with the plurality of narrowband signals and impacting the target with the plurality of narrowband signals as a single beam as a single beam from a single antenna; and processing the reflected signal comprising only the reflected broadband signal separately from the plurality of filtered reflected narrowband signals to determine a distance between the source and the target;

wherein the estimates of the relative motion are averaged to an overall estimate of the relative motion.

* * * * *